United States Patent
Holdsworth

(10) Patent No.: US 7,996,562 B2
(45) Date of Patent: Aug. 9, 2011

(54) MESSAGING SYSTEM INTERFACE TO WEB SERVICES

(75) Inventor: Simon Antony James Holdsworth, Andover (GB)

(73) Assignee: International Business Machines, Armonk, NY (US)

( * ) Notice: Subject to any disclaimer, the term of this patent is extended or adjusted under 35 U.S.C. 154(b) by 614 days.

(21) Appl. No.: 11/161,002

(22) Filed: Jul. 19, 2005

(65) Prior Publication Data

US 2006/0136600 A1    Jun. 22, 2006

(30) Foreign Application Priority Data

Nov. 30, 2004  (GB) .................................. 0426202.8

(51) Int. Cl.
*G06F 15/16*   (2006.01)
*G06F 15/173*  (2006.01)

(52) U.S. Cl. ...................................... 709/245; 709/238

(58) Field of Classification Search .................. 709/245, 709/246, 330
See application file for complete search history.

(56) References Cited

U.S. PATENT DOCUMENTS

| | | | |
|---|---|---|---|
| 6,247,057 B1 | 6/2001 | Barrera, III | 709/229 |
| 7,376,959 B2* | 5/2008 | Warshavsky et al. | 719/330 |
| 2003/0204622 A1* | 10/2003 | Blizniak et al. | 709/241 |
| 2004/0003033 A1* | 1/2004 | Kamen et al. | 709/203 |
| 2004/0030627 A1* | 2/2004 | Sedukhin | 705/36 |
| 2004/0111466 A1* | 6/2004 | Beringer et al. | 709/203 |
| 2004/0215824 A1* | 10/2004 | Payrits | 709/245 |
| 2004/0230674 A1* | 11/2004 | Pourheidari et al. | 709/223 |
| 2005/0021858 A1* | 1/2005 | Ruston et al. | 709/246 |
| 2005/0038708 A1* | 2/2005 | Wu | 705/26 |
| 2005/0071423 A1* | 3/2005 | Rajaniemi | 709/203 |
| 2005/0132086 A1* | 6/2005 | Flurry et al. | 709/238 |
| 2005/0160153 A1* | 7/2005 | Knutson et al. | 709/217 |
| 2005/0256882 A1* | 11/2005 | Able et al. | 707/10 |
| 2006/0015625 A1* | 1/2006 | Ballinger et al. | 709/229 |
| 2006/0029054 A1* | 2/2006 | Breh et al. | 370/385 |
| 2007/0204279 A1* | 8/2007 | Warshavsky et al. | 719/330 |
| 2007/0214308 A1* | 9/2007 | Pope et al. | 711/100 |

* cited by examiner

*Primary Examiner* — Kenny S Lin
*Assistant Examiner* — Shaq Taha

(57) ABSTRACT

A method, system and computer program for addressing a web service defined by a service definition document, such as a Web Services Definition Language (WSDL) document. The method includes, for example, generating a messaging destination for a service element, and each associated port element, of the WSDL document, and providing an invocation mechanism associated with each port destination for invoking the web service. A destination is an addressable location in the messaging configuration, such as a message queue.

12 Claims, 4 Drawing Sheets

MESSAGING SYSTEM INTERFACE TO WEB SERVICES

This application claims priority under 35 U.S.C. §119 to United Kingdom Patent Application No. 0426202.8 filed Nov. 30, 2004, the entire text of which is specifically incorporated by reference herein.

FIELD OF THE INVENTION

The present invention relates to the field of web services, and in particular to providing messaging addresses for elements of a web service.

BACKGROUND OF THE INVENTION

Web services are a new breed of web application. They are self-contained, self-describing, modular applications that can be published, located, and invoked across the web. Web services perform functions that can be anything from simple requests to complicated business processes. Examples include: a credit checking service that returns credit information when given a person's social security number; a stock quote service that returns the stock price associated with a specified ticker symbol; and a purchasing service that allows computer systems to buy office supplies when given an item code and a quantity.

A web service may, for example, be based on shared, open, and emerging technology standards and protocols, such as SOAP (Simple Object Access Protocol), UDDI (Universal Description, Discovery and Integration), and WSDL (Web Service Definition Language). In this environment web services can communicate, interact, and integrate with heterogeneous applications, irrespective of their implementation formats, thereby enabling web services to interact with one another across the Internet to facilitate dynamic integration between businesses, suppliers, partners, and customers.

The Web Services Description Language (WSDL) has been developed as a standard XML (eXtensible Markup Language) grammar for specifying properties of a web service, including what it does, where it is located and how to invoke it. WSDL describes a service as a set of 'ports' which group related interactions that are possible between the application (service requestor) and the web service (service provider). The interactions that are possible through a port are described as 'operations' which may have an input message and optionally a resulting output message. Each operation describes a potential interaction with the web service. This may be a request from the application to the web service. It could also be an interaction that can be initiated by the web service for which the application needs to take action. Interactions in either direction can be one-way or can require a response to be sent.

For example, a web service which provides an e-business application publishes its Universal Resource Locator (URL) in a well known UDDI directory. A client can then obtain the URL from the UDDI directory and contact the e-business application using the URL in order to obtain a WSDL document. The WSDL describes the interface provided for clients by the service e-business application, one or more transport mechanisms each supporting a communication protocol, for example SOAP over HTTP (HyperText Transport Protocol) and an end point address for each transport mechanism. Once a web client has the WSDL it can invoke the interface via the specified end point using the communication protocol of the specified transport mechanism. Further if the client has an e-business application with which the service e-business application may wish to communicate, the client and service may exchange WSDL documents in order to make this possible.

Many enterprises have a messaging-oriented internal network, using, for example, IBM's WebSphere® MQ, and WebSphere® Business Integration Message Broker (also known as MQSeries® Integrator (MQSI)). These enterprises increasingly want to integrate this messaging infrastructure with web service access, to allow services to be invoked from the messaging infrastructure using the standard web service protocols. Additionally, other non WSDL based protocols have been developed, and it is often not possible for a web client which makes use of one of these other, non WSDL based, business to business protocols, to communicate with web services which are described using a WSDL document.

Attempts to provide this integration have been made and typically require the use of a gateway program or proxy. These systems hide much of the detail of the web service access, including the individual ports on which the service is available. Selection of services and their ports is done using infrastructure and configuration specific to the gateway, rather than that provided by the existing messaging infrastructure.

A need exists for a mechanism which would allow web service access to integrate seamlessly with existing messaging configurations. Preferably, the invocation of the web service is customizable using a messaging product's facilities, and/or is achievable without the need for a gateway or proxy.

SUMMARY OF INVENTION

The present invention aims to address above-mentioned problems in the art. A first exemplary aspect of the present invention provides a method of addressing a web service defined by a service definition document which includes at least one port element specifying an endpoint address of the web service. The method comprises generating a messaging destination for the port element, and providing an invocation mechanism associated with the port destination, for invoking the web service in response to the receipt of a message by the port destination. A messaging destination is an addressable location in the messaging configuration, such as a message queue.

One preferred embodiment of the method comprises generating a messaging destination for a service element, and each associated port element, of a WSDL document, and providing an invocation mechanism associated with each port destination for invoking the web service. This provides a means to map from the addressable elements of a WSDL document, i.e. from port and service elements of a WSDL document to an addressable element of the messaging configuration. Facilities within the messaging infrastructure can be used to forward messages from the service destination to an appropriate port destination, using static configuration data dynamically at runtime.

The method of representing a web service within a messaging infrastructure by mapping the key elements in a WSDL document to addressable elements within the messaging configuration allows direct addressability to the individual ports within a service, as well as the service itself, using the native mechanisms of the messaging infrastructure.

In one preferred embodiment, each service element in a WSDL document is mapped to a message destination, which may have an associated mediation. A mediation is a software component which processes 'in-flight' messages between the production of a message by one application, and the consumption of a message by another application. Each port element in a WSDL document is mapped to a message destination, with an associated consumer. Each service, and each port within the service, are thus individually and directly available.

Each service may be associated with a mediation mechanism to allow selection of ports on a per message basis, or may have static configuration information to indicate the default port to be used. Each port is associated with an invocation mechanism to allow invocation of the web service and processing of the response if any.

A second exemplary aspect of the invention provides a system for addressing a web service. The system comprises a service definition document, a mapping mechanism, and an invocation mechanism. The service definition document describes the web service and includes at least one port element specifying an endpoint address of the web service. The mapping mechanism maps the port element to a messaging destination for the port, and the invocation mechanism invokes the web service in response to the receipt of a message by the port destination.

In one preferred embodiment, the service definition document comprises a service element associated with a set of one or more port elements, and the mapping mechanism is operable to map the service element to a messaging destination for the service.

BRIEF DESCRIPTION OF THE DRAWINGS

Embodiments of the present invention will now be described by way of example only, with reference to the accompanying drawings in which.

DESCRIPTION OF PARTICULAR EMBODIMENTS

Figure 1A:
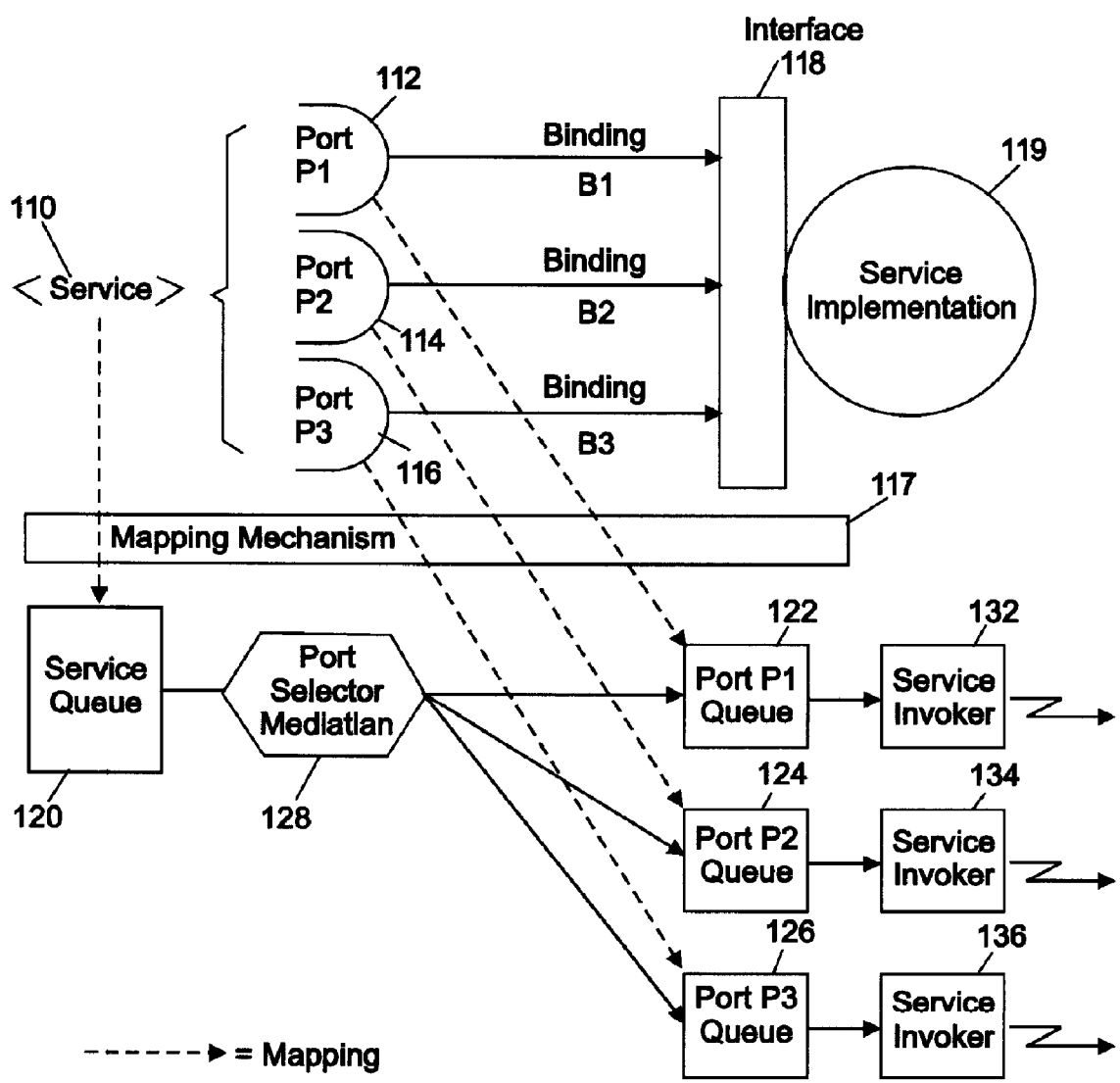
FIG. 1a shows a representation of a web service 'S' defined by a simplified example WSDL document shown in FIG. 1b and the mapping of the service and port elements of the WSDL document to addressable entities according to an embodiment of the invention.

A WSDL document defines services as collections of network endpoints, or ports. In WSDL, the abstract definition of endpoints and messages is separated from their concrete network deployment or data format bindings. This allows the reuse of abstract definitions; messages, which are abstract descriptions of the data being exchanged, and port types, which are abstract collections of operations. The concrete protocol and data format specifications for a particular port type constitute a reusable binding. A port is defined by associating a network address with a reusable binding, and a collection of ports define a service. Hence, a WSDL document uses the following elements in the definition of network services:

Types—a container for data type definitions using some type system (such as XSD);

Message—an abstract, typed definition of the data being communicated;

Operation—an abstract description of an action supported by the service;

PortType—an abstract set of operations supported by one or more endpoints;

Binding—a concrete protocol and data format specification for a particular port type;

Port—a single endpoint defined as a combination of a binding and a network address; and Service—a collection of related endpoints.

The Port Type and Messages sections define the operations and associated parameters provided by the web service; the Bindings specify the protocols supported by the web service.

A <service> is modelled as a collection of ports, where each <port> specifies an endpoint address for channels providing access to the web service using the communications protocols supported by the web service. The binding attribute of a port must correspond to the name of a binding that was defined earlier in the WSDL document.

One preferred embodiment provides a way of representing a web service within a messaging infrastructure, by mapping the key elements in a WSDL document to elements within the messaging configuration. Each service, and each port within the service, are mapped to an addressable entity in the messaging configuration, so that they are all individually and directly available. Each service is associated with a mediation mechanism to allow selection of ports on a per message basis, or is configured to forward messages to a pre-selected port; each port is associated with an invocation mechanism to allow invocation of the web service and processing of the response if any.

A mediation processes 'in-flight' messages between the production of a message by one application, and the consumption of a message by another application.

In message-based and service-oriented architectures a service integration bus may be used to support applications. The bus is a group of one or more interconnected servers or server clusters that have been added as members of the bus. Mediations can be used to customize the messaging behaviour of the bus. This may include processing such as:

transforming a message from one format into another;

routing messages to one or more target destinations that were not specified by the sending application;

augmenting messages by adding data from a data source; and distributing messages to multiple target destinations.

A mediation is associated with a destination, such as a queue or address to create a mediated destination. A mediated destination typically has two parts: pre-mediated and post-mediated. Applications send messages to the pre-mediated part, and receive them from the post-mediated part. A mediation receives messages from the pre-mediated part, transforms the messages in some way, and places one or more messages on the post-mediated part. In this way, the mediation controls the progress or otherwise of messages to their intended target address.

A significant advantage of mapping service and port elements of a WSDL document to a message address, rather than using a gateway to pass messages to the web service, is the ability to associate such mediations with each message address, i.e. with each service and with each port within that service.

In a modification, only a subset of the port elements in a WSDL may be used, i.e. messaging destinations are generated for only a subset of the port elements associated with a particular service. This may happen when not all of the ports are required by applications using the messaging system.

Also, if there is only a single port element in a WSDL, there may be no generation of a port destination with messages sent only to the service destination. However, the preference is for separate destinations to allow applications to route messages to the service destination and then the port destination, which enables logging mechanisms and other mediations to be applied to each destination separately.

Figure 1B:
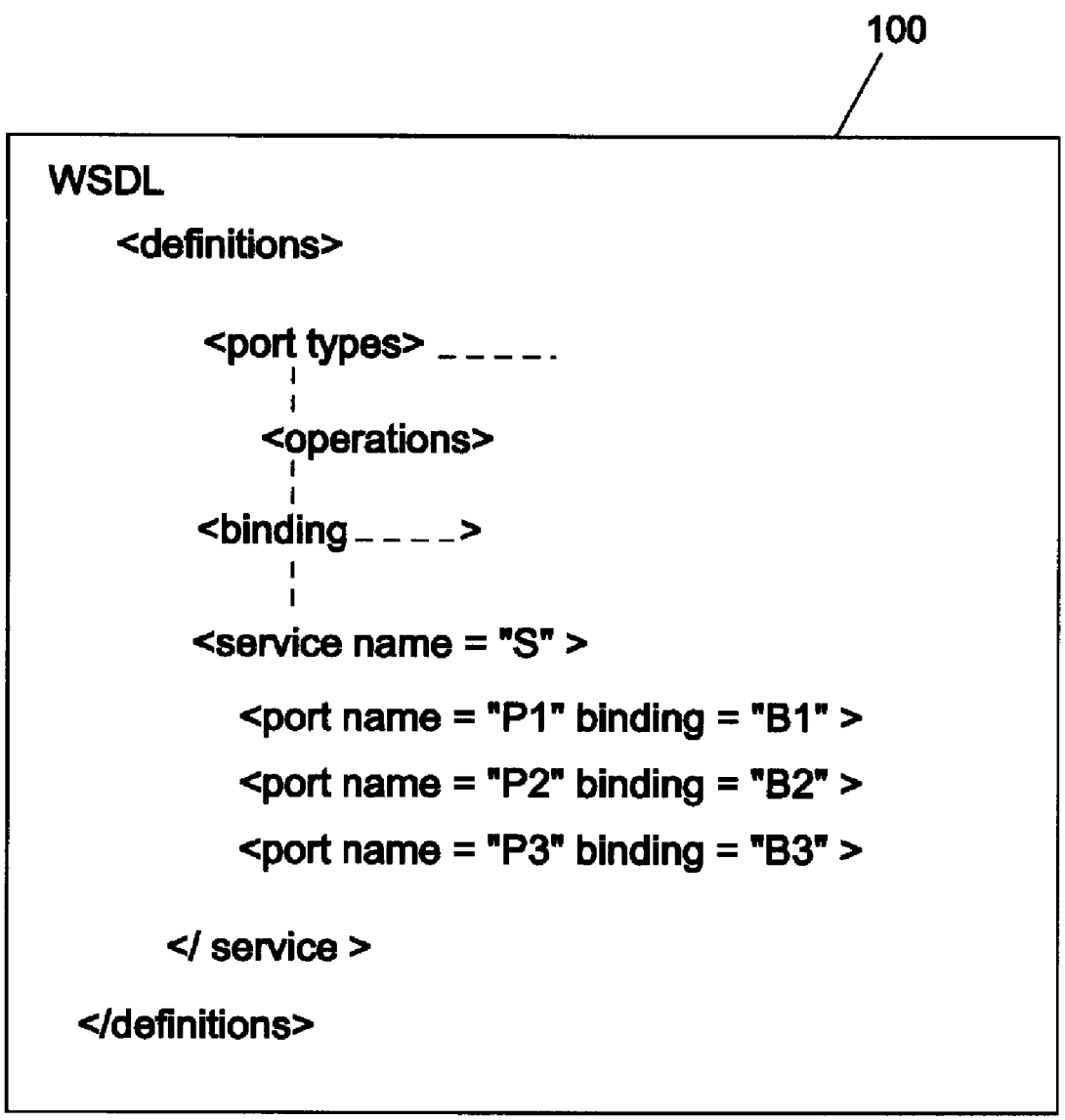
FIG. 1b shows a simplified example of a WSDL document defining a web service.

FIG. 1a shows a representation of a web service 'S' defined by the simplified example WSDL document 100 of FIG. 1b, and the mapping of the service and port elements of the WSDL document to addressable entities. The <service> 110 comprises three ports P1, P2, and P3, designated reference numbers 112, 114 and 116. Port 1 is associated with binding B1, Port 2 with binding B2 and Port 3 with binding B3. Figuratively shown also is an interface 118 through which the ports can pass messages to a service implementation 119.

Figure 2:
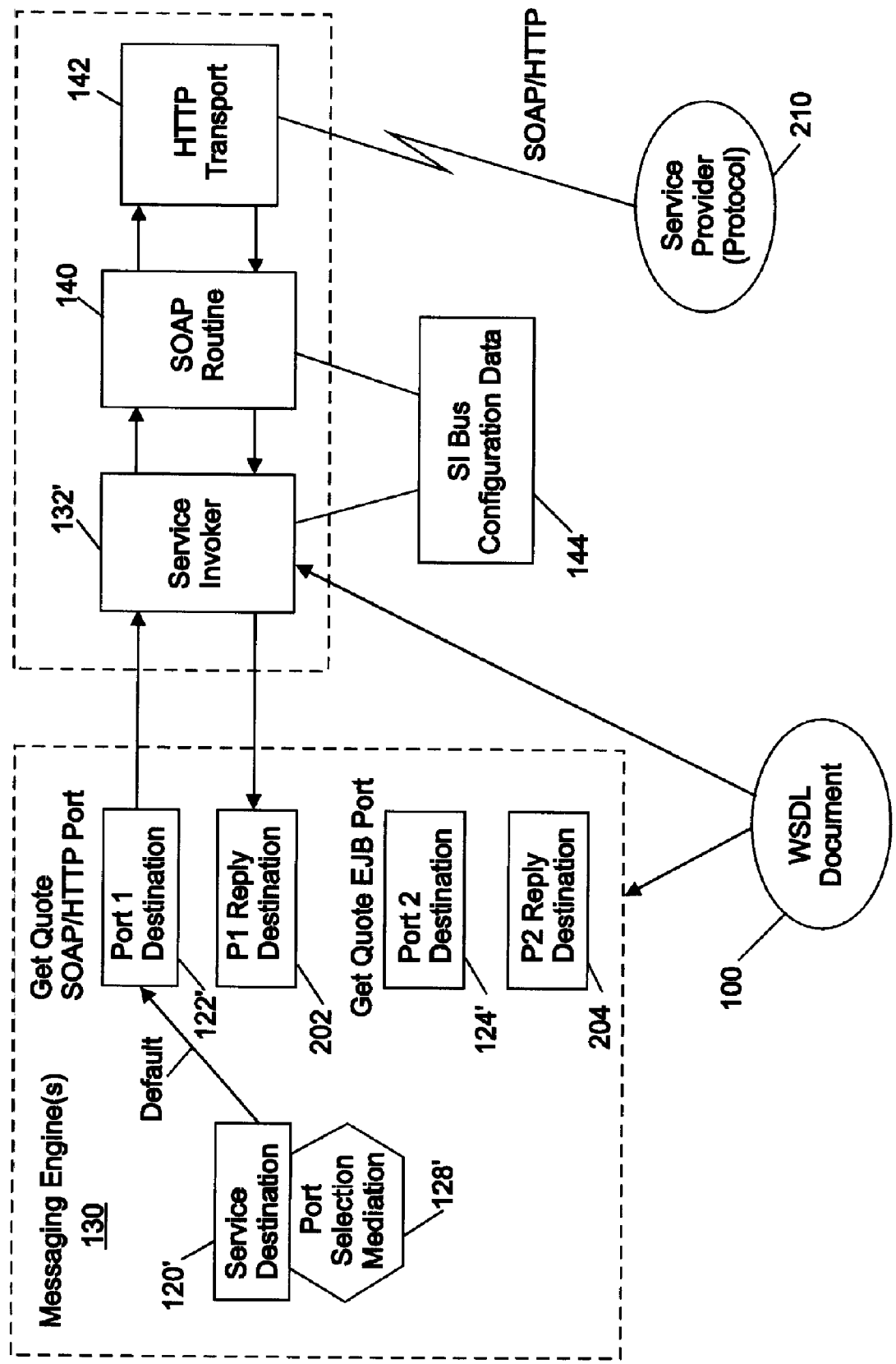
FIG. 2 shows the runtime components of a system according to an example embodiment in which the web service which provides quotes.

The addressable entities in this example are message queues, such as those used in IBM's MQ®, with MQSeries Integrator® (MQSI) being used to provide a mediation function (i.e. the port selector 128) to select ports on web service invocations by routing messages to the appropriate queues. The service element 110 is mapped to a service queue 120, and the port elements 112, 114 and 116 are mapped to port queues 122, 124 and 126 by a mapping mechanism 117. Each of the port queues has a corresponding service invoker 132, 134, 136. As shown in FIG. 2, each port destination has a corresponding reply destination which is also generated from the WSDL document, to which replies to the port are addressed.

Once these mappings have been made, a messaging application may invoke a service by addressing a message to the service queue or to one of the port queues. The messaging application itself need not be a web service, nor does it need to go through a gateway. The mapping allows the messaging application to specify the service and any of its ports as the address to which the message should be delivered.

The configuration allows the mediation attached to the service queue to be able to select from the ports that correspond to it for each message received. A default port can be automatically routed to, or the mediation can select an appropriate port depending on the message content or other factors (time of day, workload, service level, etc.).

When a message is received on a port queue, a runtime component known as a "service invoker" associated with that port queue will read the message off the queue. The service invoker may be an MQ application or a Java Messaging Service Message Driven Bean (JMS MDB) The service invoker maps the port queue name from which the message was received back to a WSDL document and WSDL port element, and uses the WSDL document, along with any additional configuration that may be available, to invoke the web service, communicating therewith via the protocols specified by the port binding element of the WSDL document.

The runtime will be explained in more detail below with reference to FIG. 2, which shows an example of the runtime components that might be used in a similar configuration using the Platform Messaging (PM) component of IBM's WebSphere® Application Server. In PM, messaging addresses are referred to as destinations. In FIG. 2 a PM messaging engine 130 generates a mapping from a WSDL service S and its two WSDL ports, P1, P2, to PM messaging destinations 120', 122', 124'. A PM messaging engine provides the core messaging functionality of a service integration bus, manages bus resources, and provides a connection point for applications.

The messaging engine is connected to a Service Integration Bus (SIBus) service invoker system application with a SOAP runtime 140, and HTTP transport 142, through which the service invoker for port 1 connects to the service provider 210. The service invoker 132' and SOAP runtime 140 are able to access configuration data 144 for the SIBus, such as security data, transactional details, and extra functionality.

The configuration allows the mediation attached to the service destination to be able to select from the ports that correspond to it for each message received. This selection uses the PM model for mediations, namely by updating the forward routing path.

The service invoker associated with a port destination acts as a consumer, reading messages received by the destination. This service invoker knows the identity of the destination from which it receives each message, and can use configuration data to map that to the service and port that it represents, and can thus look up the appropriate WSDL document 100, enabling it to invoke the service.

Additional configuration associated with the service invoker can allow additional standard web service client functionality, such as Web Services Security (WS-Security), Web Services Transactions (WS-Transactions), Java APIs for XML-based Remote Procedure Call (JAX-RPC) handlers, etc.

An optimization in the case of a single port might be to make the service destination an alias for the port destination, so that messages addressed to the service destination are routed by the messaging engine directly to the port destination.

It may be noted that the destination that represents the service never has consumers, and so exists only to route requests to a port destination or to a mediation. Preferably, a specific type of destination is provided to represent web services, which allows efficient operation in this case.

This configuration allows individual ports within the web service definition to be addressed directly by messaging components using their natural message routing mechanisms. Preferably this is done by producers or mediations setting the appropriate destination(s) in the forward routing path, which is used by the messaging infrastructure to route messages between destinations.

The operation of the system will now be described in relation to an example of a web service which provides quotes, with reference to the components of FIG. 2. An input message 'getQuote' is sent to a service destination 120' which has been mapped from a WSDL document defining the web service.

The service destination 120' in this example has an associated default port destination, meaning that all messages which are received by the service destination are by default passed to the default port destination. If the default is not to be used for a particular message, an alternative must be determined; this is done by the port selection mediation 128. A message is originally sent to a pre-mediated part of the service destination, from which the mediation mechanism receives the message. The mediation mechanism then updates the destination address of the message to refer to the selected port, before placing the message on the post-mediated part of the service destination. In the case where there is a single port that is to be used for all messages, no mediation is required.

In the example of FIG. 2, the default port P1 and corresponding port destination 122' are a getQuote SOAP/HTTP port and port destination, which means that the port is associated with a SOAP/HTTP protocol binding. The other (non-default) port P2 and corresponding port destination 124' for this service are a getQuote EJB port and port destination.

It is possible also to direct messages directly to either of the port destinations if a client knows the port through which it wishes to connect to the service. Additionally, a message may specify plural destinations, i.e. that the message be sent to the EJB port destination via the service destination 120'. This is useful in the event that the service destination has additional non-routing mediation associated with it, for example to do logging for all messages directed at the service.

On receipt of the getQuote request message at the port 1 destination 122', the service invoker 132' associated with that port destination reads the message. It then uses its configuration data, which specifies to which port and web service it is associated, to access the appropriate WSDL document 100, from which information it can invoke the getQuote service 210. A reply message including the requested quote from the service is addressed and delivered to the port 1 reply destination 202.

As each of the destinations generated for the port and service elements of the WSDL are mediatable destinations, other mediation mechanisms, such as logging mechanisms, may also be associated with any of the generated destinations, as required. For example, the port reply destination may be used to support a scenario where processing is required to occur against the response message. An example might be a response time calculator which is implemented by associating a mediation with the port destination that generates a timestamp, and associating a mediation with the port reply destination that compares the current time against that timestamp to calculate the elapsed time for the invocation of the target service.

Figure 3:
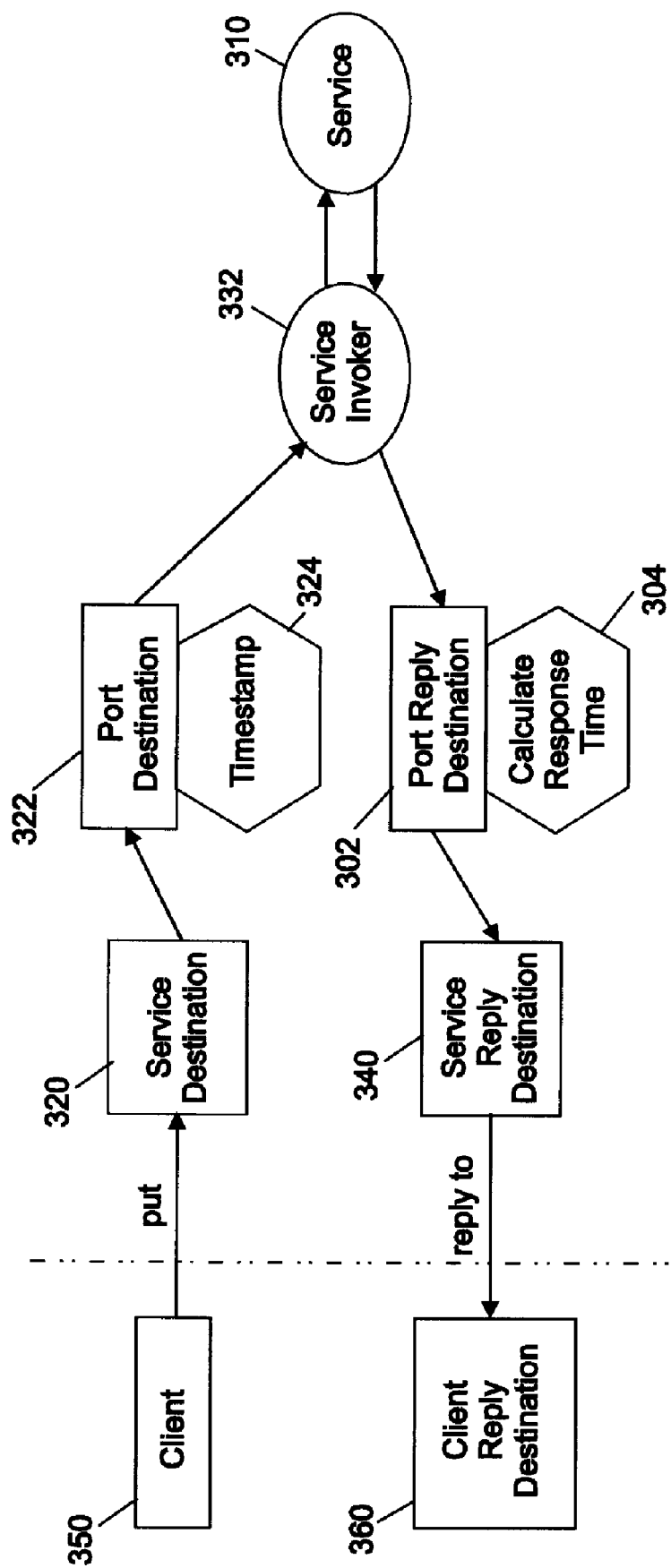
FIG. 3 shows the message flows associated with an implementation which includes time-stamping mediations.

The message flows associated with this example implementation are shown in FIG. 3. A client 350 puts the message onto the service destination 320, which forwards the message to a default port destination 322. The mediation 324 associated therewith timestamps the message before consumption by the service invoker 332. The service 310 addresses the reply to the Port Reply destination 302 to which it is then passed by the service invoker. The mediation 304 associated with the port reply destination then calculates the response time, before the reply is forwarded to the service reply destination 340 and then on to the client reply destination 360.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disc or tape, optically or magneto-optically readable memory such as compact disk (CD) or Digital Versatile Disk (DVD) etc, and the processing device utilizes the program or a part thereof to configure it for operation.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of".

What is claimed is:

1. A method for communicating with a web service defined by a service definition document that defines at least one of one or more port elements, each specifying an endpoint address for the web service, said method being performed in a computer-implemented messaging system having one or more addressable queues for storing received messages, said method comprising:
    associating a first addressable queue in said messaging system with one of said one or more port elements;
    associating a second addressable queue in said messaging system with said service element;
    monitoring said addressable queues for a received message; and
    in response to detection of a received message in said first addressable queue, invoking the web service defined by the port element associated with said first addressable queue; and
    in response to detection of a received message in said second addressable queue,
        selecting one of the plurality of port elements defined by said service
        definition document, and
        sending a message to a different addressable queue associated with said selected port element.

2. A method according to claim 1 wherein the service definition document is a Web Services Definition Language (WSDL) document and wherein associating an addressable queue in said messaging system with a service element or port element defined by said service definition document further comprises mapping different elements of the WSDL document to different addressable queues in said messaging system.

3. A method according to claim 2 wherein invoking the web service defined by said service definition document further comprises calling an invocation mechanism having configuration data enabling the invocation mechanism to locate the WSDL document defining the web service.

4. A method according to claim 3 further comprising:
    designating at least one addressable queue in said messaging system to receive a reply message generated by said web service;
    monitoring said designated addressable queue for a received reply message; and
    in response to detection of a received reply message in said designated addressable queue, forwarding said received reply message to a using application.

5. A computer program product for communicating with a web service defined by a service definition document that defines one of one or more port elements and a service element associated with one or more port elements, each specifying an endpoint address for the web service, said computer program product comprising a recording medium embodying computer usable program code that when loaded into and executed by a computer-implemented messaging system having one or more addressable queues for storing received messages performs a method comprising:
    associating a first addressable queue in said messaging system with one of said one or more port elements;

associating a second addressable queue in said messaging system with said service element;

monitoring said addressable queues for a received message; and in response to detection of a received message in said first addressable queue, invoking the web service defined by the port element associated with said first addressable queue; and in response to detection of a received message in said second addressable queue,
- selecting one of the plurality of port elements defined by said service definition document, and
- sending a message to a different addressable queue associated with said selected port element.

6. A computer program product according to claim 5 wherein the service definition document is a Web Services Definition Language (WSDL) document and wherein the computer usable program code for associating an addressable queue in said messaging system with a service element or port element defined by said service definition document comprises computer usable program code for mapping different elements of the WSDL document to different addressable queues in said messaging system.

7. A computer program product according to claim 6 wherein the computer usable program code for invoking the web service defined by said service definition document further comprises computer usable program code for calling an invocation mechanism having configuration data enabling the invocation mechanism to locate the WSDL document defining the web service.

8. A computer program product according to claim 7 further comprising computer usable program code for:

designating at least one addressable queue in said messaging system to receive a reply message generated by said web service;

monitoring said designated addressable queue for a received reply message; and in response to detection of a received reply message in said designated addressable queue, forwarding said received reply message to a using application.

9. A computer-implemented messaging system for communicating with a web service defined by a service definition document that defines at least one of one or more port elements and a service element associated with one or more port elements, each specifying an endpoint address for the web service, said computer-implemented messaging system comprising:

one or more addressable queues for storing received messages;

mapping logic for associating a first one of said addressable queues with one of the port elements defined by said service definition document and a second one of said addressable queues with said service element;

logic for detecting receipt of a message in said first one of said addressable queues;

invocation logic responsive to detection of a message in said first one of said addressable queues for invoking the web service defined by the port element associated with said first one of said addressable queues;

logic for detecting receipt of a message in said second one of said addressable queues; and invocation logic responsive to detection of a message in said second one of said addressable queues for
- selecting one of the plurality of port elements defined by said service definition document; and
- sending a message to a different addressable queue associated with said selected port element.

10. A computer-implemented messaging system according to claim 9 wherein the service definition document is a Web Services Definition Language (WSDL) document and wherein mapping logic for associating one of said addressable queues with one of the port elements defined by said service definition document further comprises mapping logic for associating different elements of the WSDL document with different addressable queues in said messaging system.

11. A computer-implemented messaging system according to claim 10 wherein invocation logic responsive to detection of a message in an addressable queue for invoking the web service defined by the port element associated with said addressable queue further comprises data storage for storing configuration data enabling the invocation mechanism to locate the WSDL document defining the web service.

12. A computer-implemented messaging system according to claim 11 further comprising:

mapping logic for designating at least one addressable queue in said messaging system to receive a reply message generated by said web service;

logic for detecting receipt of message in said addressable queue designated to receive said reply message; and logic responsive to detection of a message in said addressable queue for forwarding said received reply message to a using application.

* * * * *